(12) United States Patent
Marlett et al.

(10) Patent No.: US 12,115,993 B2
(45) Date of Patent: Oct. 15, 2024

(54) CONTACT AND AUDIBLE SENSOR SYSTEM TO DETECT AND WARN DRIVER OF ENVIRONMENTAL CONDITIONS

(71) Applicant: Continental Automotive Systems, Inc., Auburn Hills, MI (US)

(72) Inventors: Brian J Marlett, Macomb, MI (US); Robert M Andres, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 153 days.

(21) Appl. No.: 17/447,435

(22) Filed: Sep. 12, 2021

(65) Prior Publication Data

US 2023/0083999 A1 Mar. 16, 2023

(51) Int. Cl.
| | |
|---|---|
| *B60W 40/00* | (2006.01) |
| *B60W 40/02* | (2006.01) |
| *B60W 50/16* | (2020.01) |
| *B60W 60/00* | (2020.01) |
| B60W 50/14 | (2020.01) |

(52) U.S. Cl.
CPC ............ *B60W 40/02* (2013.01); *B60W 50/16* (2013.01); *B60W 60/00* (2020.02); *B60W 2050/146* (2013.01); *B60W 2420/54* (2013.01); *B60W 2554/00* (2020.02); *B60W 2555/20* (2020.02)

(58) Field of Classification Search
CPC ...... B60W 40/02; B60W 50/16; B60W 60/00; B60W 2050/146; B60W 2420/54; B60W 2554/00; B60W 2555/20
USPC .......................................................... 701/1
See application file for complete search history.

(56) References Cited

U.S. PATENT DOCUMENTS

| | | | |
|---|---|---|---|
| 6,153,995 A  * | 11/2000 | Tanaka ................. | G01N 21/552 |
| | | | 318/483 |
| 10,228,696 B2 | 3/2019 | Myers et al. | |
| 10,549,734 B2 | 2/2020 | Jung | |
| 11,414,101 B1 * | 8/2022 | Hinojosa ........... | B60W 60/0016 |
| 2018/0099646 A1 * | 4/2018 | Karandikar ............ | G06V 20/56 |
| 2019/0145924 A1 * | 5/2019 | Kanning .............. | G01N 27/223 |
| | | | 324/664 |
| 2021/0074091 A1 * | 3/2021 | Wang .................... | G07C 5/0825 |
| 2021/0103747 A1 * | 4/2021 | Moustafa ................ | G06F 18/25 |
| 2021/0385573 A1 * | 12/2021 | Popa ...................... | H04R 1/406 |
| 2022/0348192 A1 * | 11/2022 | Josephs ............. | B60W 60/0015 |
| 2022/0363260 A1 * | 11/2022 | Stenneth ............. | B60W 30/182 |
| 2023/0074274 A1 * | 3/2023 | Kim ...................... | B60W 50/00 |

FOREIGN PATENT DOCUMENTS

| | | |
|---|---|---|
| DE | 102005023696 A1 | 11/2006 |
| DE | 102008062735 A1 | 6/2010 |
| DE | 102018007567 A1 | 7/2019 |
| KR | 102498435 B1 * | 1/2021 |

* cited by examiner

*Primary Examiner* — Tiffany P Young

(57) ABSTRACT

A vehicle control system employing acoustic and impact sensors for sensing acoustics and vibrations at a vehicle to detect environmental conditions and provide appropriate vehicle control and driver warnings according to the environmental conditions. The acoustics may include sounds generated by objects in the external environment surrounding the vehicle or sounds generated by impacts on the vehicle. The vibrations may include vibrations of the vehicle generated by the sounds generated by objects in the external environment surrounding the vehicle or vibrations of the vehicle generated by the impacts on the vehicle.

16 Claims, 7 Drawing Sheets

CONTACT AND AUDIBLE SENSOR SYSTEM TO DETECT AND WARN DRIVER OF ENVIRONMENTAL CONDITIONS

BACKGROUND

1. Field

The present application relates to automotive safety, and more particular to acoustic and microelectromechanical systems (MEMS) sensors for sensing acoustics and vibrations at a vehicle to detect environmental conditions and provide appropriate vehicle control and driver warnings according to the environmental conditions.

2. Description of Related Art

Conventionally, an automotive vehicle may include one or more driver information systems that provide a messaging interface between the vehicle and the driver. The messaging interface may include an instrument cluster provided in the vehicle dashboard, a more located centrally vehicle information control and display system, or other location. When an environmental condition is detected, a message may be displayed on the instrument cluster, audibly output by one or more speakers, or by tactile sensation and vibration for informing a driver or occupant of the vehicle of the environmental condition.

Environmental conditions detected by vehicle systems may include weather conditions. For example, vehicle systems may detect the possibility of icy road conditions through use of a temperature sensor for detecting an external temperature of the surrounding environment or a braking or traction sensor for detecting wheel slippage. Accordingly, a warning that ice may be possibly present during operation of the vehicle may be provided to the driver. In an alternative example, vehicle systems may detect the presence of rain, such as through the use of imaging techniques. As a result, the driver of the vehicle may be informed of potential or actual environmental conditions for appropriately controlling the vehicle.

More recently, in addition to providing a warning, driver assisted vehicle control systems and autonomous vehicle control systems have been developed to properly control vehicle systems in the event of detected weather conditions. For example, if a dangerous wind condition is detected, vehicle steering and propulsion systems may control a direction and a speed of the vehicle to mitigate an impact on vehicle stability due to strong winds.

Naturally, other external environmental conditions that potentially warrant issuing a warning to a driver or performing assistance in control of a vehicle may exist. Accordingly, it would be desirable to more accurately detect additional types of environmental and surrounding conditions that could impact vehicle performance beyond the use of conventional imaging, temperature, and other sensors.

SUMMARY

Aspects of embodiments of the present application relate to methods and systems for detecting external conditions in an environment in which a vehicle operates utilizing audio-based technology.

Aspects of embodiments of the present application also relate to methods and systems for detecting sounds airborne in environments in which a vehicle operates and detecting physical impacts on a structure of the vehicle utilizing audio-based technology, to determine external conditions of the environment in which the vehicle operates.

Aspects of embodiments of the present application also relate to detecting road surfaces and providing information about the detected road surfaces to other controllers on the vehicle. Other controllers of the vehicle may then determine the appropriate control actions according to risks associated with the road surfaces or conditions, for example in an autonomous vehicle or appropriate warnings for a manually driven car.

According to an aspect of an embodiment, there is provided a method of controlling a vehicle based on an environmental condition in an environment surrounding the vehicle, the method including detecting sounds generated by impacts on the vehicle or vibrations of the vehicle generated by the impacts on the vehicle, determining the environmental condition corresponding to the impacts on the vehicle or vibrations of the vehicle generated by the impacts on the vehicle, determining a vehicle control action to be performed based on the environmental condition, and controlling a vehicle system of the vehicle to perform the vehicle control action.

According to an aspect of an embodiment, there is provided method of controlling a vehicle based on an environmental condition in an environment surrounding the vehicle, the method including detecting sounds generated by objects in the external environment surrounding the vehicle, determining the environmental condition corresponding to the sounds generated by objects in the external environment surrounding the vehicle, determining a vehicle control action to be performed based on the environmental condition, and controlling a vehicle system of the vehicle to perform the vehicle control action.

BRIEF DESCRIPTION OF THE DRAWINGS

The above and other aspects will be more clearly understood from the following brief description taken in conjunction with the accompanying drawings, in which.

DETAILED DESCRIPTION

Figure 1:
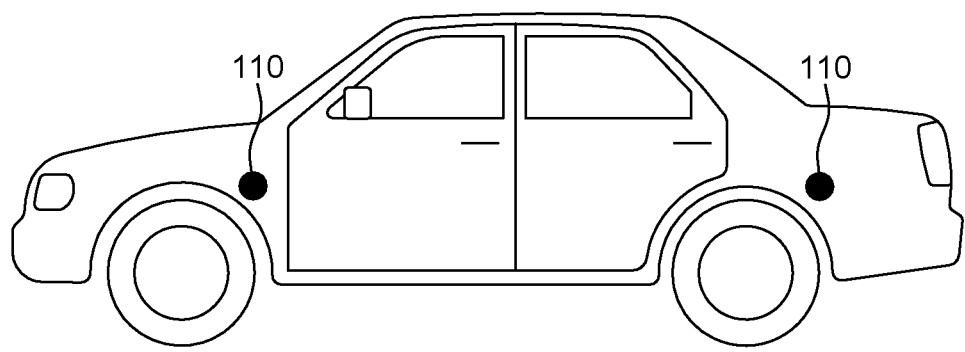
FIG. 1 is a diagram illustrating a vehicle including a Sensor system solution, according to an embodiment.
Figure 1:
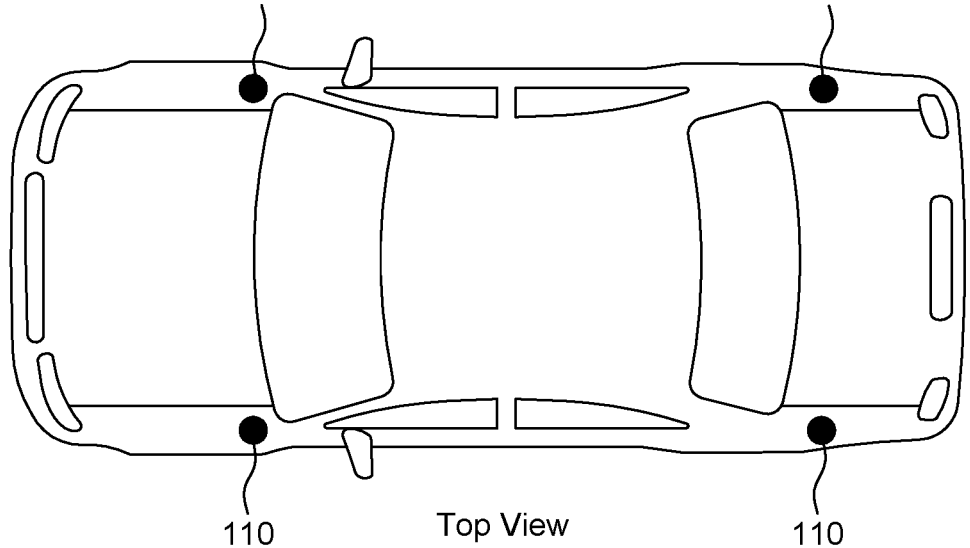

FIG. 1 illustrates a vehicle including a sensor system, according to an embodiment.

A sensor system solution 100 may include a plurality of sensors 110. The plurality of sensors 110 may include acoustic sensors and impact sensors. The sensor system may include any quantity of sensors for detecting sounds airborne in environments in which a vehicle operates and detecting physical impacts on a structure of the vehicle. For example, the sensor system may include at least one acoustic sensor for detecting sounds airborne in environments in which a vehicle operates and at least one impact sensor, such as an accelerometer, for detecting physical impacts on a structure of the vehicle, though multiple acoustic sensors and multiple impact sensors may be present. In an embodiment, the plurality of sensors 110 may include microelectromechanical systems (MEMS) sensors for use in impact sensors, microphones, and several other types of sensors.

The acoustic sensor may be any sensor configured to detect airborne sounds in the external environment in which the vehicle operates. The acoustic sensor may include a microphone, a hydrophone, or any other sensor capable of detecting sound vibrations in the external environment in which the vehicle operates.

The sounds detected by the acoustic sensor may include sounds emanating from sources in the external environment in which the vehicle operates, including sounds emitted from other objects, such ambulances, firetrucks, and other vehicles, pedestrians, animals, transportation infrastructure, such as bridge signals, vehicle and pedestrian crossing signals. The sounds detected by the acoustic sensor may also include sounds resulting from impacts on a vehicle body of the vehicle, including the impact of weather effects, such as rain, snow, sleet, hail, wind, water, etc., and the impact of foreign objects, such as rocks, stones, dust, sand, etc., on the vehicle body. Additionally, the sounds detected by the acoustic sensor may also include sounds resulting from the interaction between the vehicle (tires) and roadways on which the vehicle travels, including rumble strips, unworked pavement, etc.

The impact sensor may be any sensor configured to detect vibrations of the vehicle due to physical, structural impacts on any structure of the vehicle, such as an accelerometer. The impacts on the vehicle may include the impact of weather effects, such as rain, snow, sleet, hail, wind, water, etc., and the impact of foreign objects, such as rocks, stones, dust, sand, vegetation, etc., on the vehicle body.

To detect sounds airborne in environments in which a vehicle operates and physical impacts on a structure of the vehicle, the acoustic and impact sensors may be mounted to various portions of a vehicle body of the vehicle. For example, the sensors may be mounted to one or more of an interior or exterior surface of the vehicle body, and an interior or exterior surface of a component of the vehicle body, including doors, fenders, hood, trunk, windshield, window, etc. The sensors can be mounted to the backside of the outer sheet metal near all four tires to facilitate the sensing of the road noise and/or impacts from road debris or water spray. Additionally, the sensors may be mounted to a frame of the vehicle, including an undercarriage or pillar of the vehicle. Still further, the sensors may be disposed within or integrated with one or more components or systems of the vehicle, including braking systems, steering systems, wheels and tires, etc.

Figure 2:
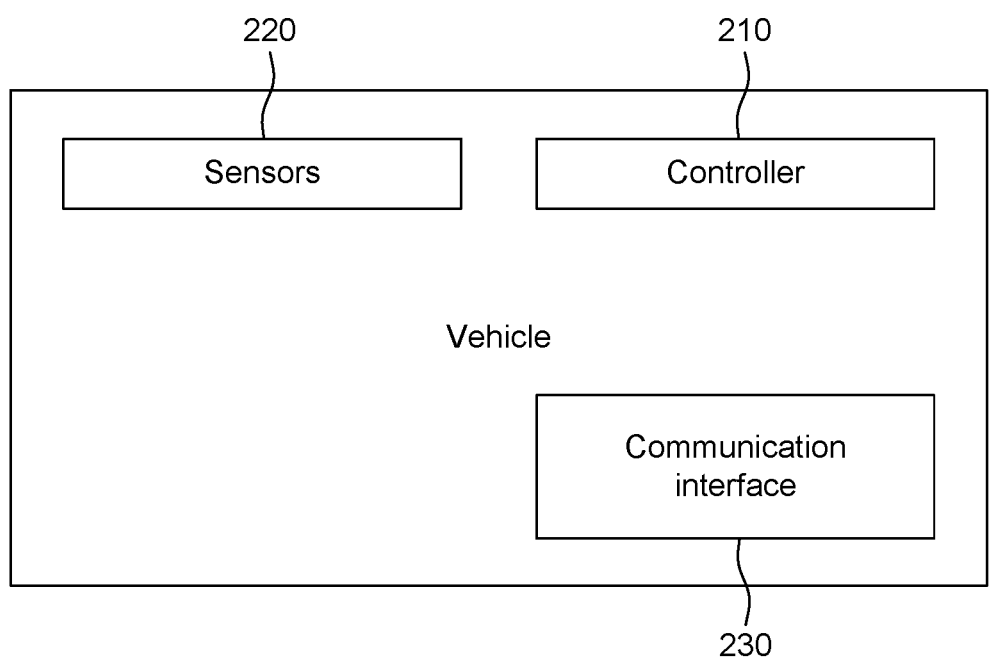
FIG. 2 is a block diagram illustrating configuration of a sensor in a vehicle, according to an embodiment.

FIG. 2 is a block diagram illustrating configuration of a sensor system in a vehicle, according to an embodiment.

As illustrated in FIG. 2, the sensor system 200 may include a controller 210, a plurality of sensors 220, and a communication interface 230.

The controller 210 may be a central processing unit (CPU), electronic control unit (ECU), microprocessor, application-specific integrated circuit (ASIC), or other programmable circuitry. The controller 210 may include memory, such as random access memory (RAM), cache memory, or other memory programmed to store computer-readable instructions executable by the controller 210 for controlling operations of the sensor system.

The computer-readable instructions executed under the control of the controller 210 may cause the controller 210 to provide a method of detecting sounds airborne in an environment in which the vehicle operates and a method of detecting physical impacts upon a structure of the vehicle. Upon detection of the sound within the environment and vibrations due to collisions or impacts on the vehicle, which may be of low speed or low intensity, the controller 210 may classify the sounds and collisions. The controller 210 may employ an artificial intelligence (AI) algorithm to detect the sounds and collisions, classify the sounds and collisions, and identify an environmental condition corresponding to the classification. Once the environmental condition has been identified, the controller 210 may determine an action to be performed with respect to the environmental condition, and signal one or more vehicle control systems to effect appropriate controls of the vehicle and/or issue warnings to a driver or occupant of the vehicle. Additional details with respect to operations of the sensor system are discussed below with respect to FIGS. 3 and 4.

The controller 210 may be communicatively coupled to the plurality of sensors 220 via the communication interface 230, which may include a wired bus or wireless communication interface that performs communication by one or more wireless protocols, such as WiFi, Bluetooth, or other applicable wireless vehicle communication protocol or standard. Additionally, the controller 210 may be communicatively coupled via the communication interface 230 to one or more vehicle control systems of the vehicle, such as braking, acceleration, suspension, steering, seat belt tension, door locks, windows, and the like.

The plurality of sensors 220 may include at least one acoustic sensor for detecting sounds airborne in environments in which a vehicle operates and at least one impact sensor for detecting physical impacts on a structure of the vehicle, though multiple acoustic sensors and multiple impact sensors may be present. The acoustic sensor and the impact sensor have been discussed in detail above with respect to FIG. 1. Each sensor of the plurality of sensors 220 may include a wired or wireless communication interface, which performs communication by one or more wireless protocols, such as WiFi, Bluetooth, or other applicable wireless vehicle communication protocol or standard, for performing communication with the controller 210, other sensors among the plurality of sensors 220, and the communication interface 230. Additionally, each sensor among the plurality of sensors may be communicatively coupled to one or more vehicle control systems of the vehicle, such as braking, acceleration, suspension, steering, seat belt tension, door locks, windows, and the like.

Figure 3:
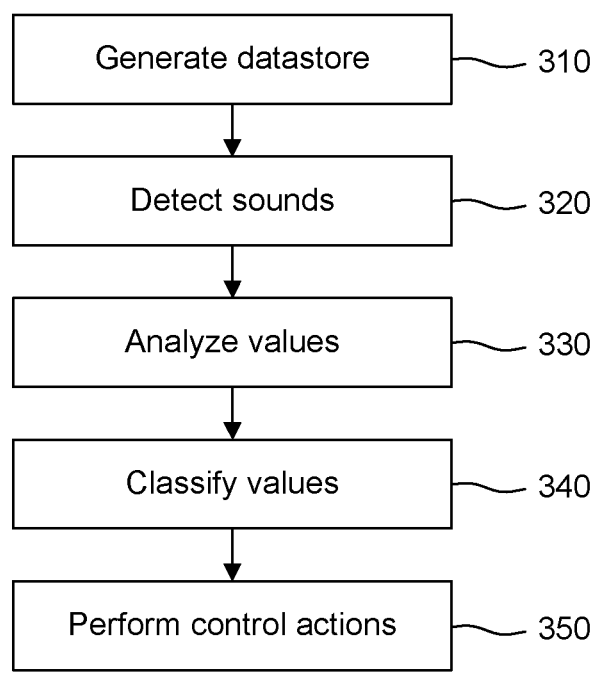
FIG. 3 is a flowchart illustrating a method of a sensor detecting physical impacts on a vehicle, according to an embodiment.

FIG. 3 is a flowchart illustrating a method of a sensor system detecting physical impacts on a vehicle, according to an embodiment. The method 300 of a sensor system detecting physical impacts on a vehicle may be performed under control of the controller 210 in communication with the plurality of sensors 220 of the sensor system 200 illustrated in FIG. 2.

Road conditions can suddenly change from safe to unsafe based on the weather or other external factors. Correspondingly, the sound generated by the tires on the road surface changes based on the surface conditions (i.e. dry, wet, snow, gravel, etc.). Accordingly, an algorithm can determine the road surface condition based on the sound of the road noise in combination with the speed of travel, engine speed, and the proximity to other objects.

Inputs for determining existence of an object or a road/environmental condition may include signals from four sensors mounted near each tire, to "hear" road noise from the tires and "feel" impacts from road debris and/or water spray for determining plausibility by comparing signals to each other. Additionally, inputs for determining existence of an object or a condition may include information from the blind spot detection, to identify presence of driving next to an object (i.e., guardrail, wall, car, large truck, etc.), information from forward looking advanced driver assistance systems (i.e., camera and/or radar sensors), to cancel out noise from cars passing near the vehicle, vehicle speed inputs to determine the level of expected road noise related to the speed of travel, and engine speed or rotation inputs to cancel out the expected engine noise.

In step 310, a datastore of sensor information of a plurality of sensors mounted to a vehicle is established.

The plurality of sensors may be the plurality of sensors 220 of the sensor system 200 illustrated in FIG. 2, such as the acoustic sensor for sensing sounds generated by impacts on the vehicle and the impact sensor for sensing vibrations and percussions generated by the impacts on the vehicle.

The datastore may be stored as a database, lookup table, or other data structure accessible to the controller 210. For example, the datastore may be stored in memory of the controller 210, stored in a separate memory of the sensor system, stored in a memory of another vehicle control system, or stored in a datastore external to the vehicle but accessible to the controller 210 by the communication interface.

The datastore may store a record associated with each sensor of the plurality of sensors. Each record may include fields of information associated with the sensor.

An identifier field stored in the record associated with the sensor may store an identifier that uniquely identifies the sensor. The identifier may include one or more of a serial number of the sensor, a part number of the sensor, a communication address of the sensor, such as a Medium Access Control (MAC) identifier of a communication interface of the sensor, or other information that uniquely distinguishes the identity of the sensor from other identities of the plurality of sensors.

A location field stored in the record associated with the sensor may store a location on the vehicle that uniquely identifies the location at which the sensor is disposed on the vehicle. The location field may include a component of the vehicle on which the sensor is mounted including such as door, a fender, a hood, a trunk, a windshield, and a window of the vehicle. The location field may further include a local location of the sensor on the component of the vehicle. Thus, the location may relatively refer to a local location on the component of the vehicle. Alternatively, the location may identify a global location on the vehicle, such as a coordinate on a coordinate system mapped to the vehicle.

An expected floor field stored in the record with the sensor may store a value of an expected floor value detected by the sensor. The expected floor value may be a frequency, amplitude, or other characteristic of a vibration. For example, during operation of the vehicle, an expected value of ambient noise due to impacts generated by the vehicle or ambient vibrations generated by the vehicle under customary operating conditions, and in the absence of external noise in the surrounding environment or unexpected impacts to the vehicle, may be established and recorded. In the instance of detecting physical impacts to the vehicle, the ambient noise from impacts on the vehicle, which are generated by the vehicle, may be expected to be zero. However, during normal operation, every vehicle will experience some level of ambient vibrations owing to power generation, operation of other vehicle systems, such as for example heating and air conditioning, and transverse motion of the vehicle.

The expected floor field may be associated in the datastore with various customary operating conditions of the vehicle, including but not limited to a speed of the vehicle, a direction of travel of the vehicle, such as a forward direction, a reverse direction, a left turning direction, and a right turning direction, a tire pressure of one or more tires of the vehicle, a weight of the vehicle, and any other variable condition of the vehicle that could impact the value of ambient vibrations generated by the vehicle in the absence of external noise in the surrounding environment or unexpected impacts to the vehicle. As a result, the datastore may store a dataset of fields, tables, and other information that may collectively represent an ambient model of the ambient vibrations generated by the vehicle under operating conditions in the absence of external noise in the surrounding environment or unexpected impacts to the vehicle.

The datastore of sensor information of the plurality of sensors mounted to the vehicle may be determined experimentally based on a manufacturer and model of the vehicle. Alternatively, the datastore of sensor information may be initialized according to the type of sensor, location of sensor, and quantity of sensors mounted to the vehicle, and the expected ambient vibrations generated by the vehicle in the absence of external noise in the surrounding environment or unexpected impacts to the vehicle may be trained or learned through operation of the vehicle by an artificial intelligence (AI) model executed by the controller 210 of the sensor system 200 or by a centralized server of a distributed system to which sensor values are provided by the sensor system 200.

In step 320, once the datastore of sensor information is established in step 310, values output by the acoustic sensor representing detected sounds generated by impacts on the vehicle and values output by the impact sensor representing detected vibrations and percussions generated by the impacts on the vehicle may be obtained. The values output by the sensors may be provided to the controller of the sensor system for evaluation, for example by the communication interface 230 in FIG. 2.

In step 330, the values output by the plurality of sensors are analyzed. The values output by the plurality of sensors may include values output by the acoustic sensor representing detected sounds generated by impacts on the vehicle and values output by the impact sensor representing detected vibrations and percussions generated by the impacts on the vehicle.

For example, with respect to analyzing the values output by the plurality of sensors, a frequency of the signal and an amplitude of the signal may be analyzed. Frequency and amplitude are relevant for both acoustic and acceleration signals. In an instance in which a vehicle is driving on a gravel road with loose stones, the signals detected by the plurality of sensors may include periodic and persistent stone impacts. The impact of a stone will generate a brief signal burst with high amplitude that oscillates with a frequency that is natural to the surface to which the sensor is mounted. Normal driving conditions (without impacts) will keep acceleration signals within the +/−1.2 g range. This range may determined by the vehicle's ability to accelerate, decelerate, and corner, which are dependent on the vehicle's tires, brakes, and road surface coefficient of friction, among other things. Impacts from stones or other road debris will likely generate brief amplitudes above the +/−1.2 g range.

An acoustic sensor will react to airborne and structural borne (vibrations in the mounting surface) sound. However, an accelerometer (or MEMS sensor) will not sense airborne sound. Accordingly, a combination of acoustics and acceleration allows the system to determine if the signal is due to sound, impact, or both.

The values output by the plurality of sensors may be modeled according to the ambient model from the datastore of sensor information. Accordingly, the controller may determine an operating model of the vehicle based on the values of the sensor information in the datastore and the values output by the plurality of sensors.

In step 340, the operating model of the vehicle may be classified. The operating model may be classified according to type of impacts on the vehicle. For example, the controller may classify the operating model of the vehicle through an artificial intelligence (AI) model executed by the controller 210 of the sensor system 200 or by a centralized server of a distributed system to which sensor values are provided by the sensor system 200. The operating model may be classified based on comparison with the ambient model and one or more operating models representative of a type of impact on the vehicle.

For example, one or more operating models may include models of dry pavement (a normal condition), very wet pavement (a hydroplane risk), loose gravel (loss of control risk), washboard unpaved road (loss of control risk), snow covered road (loss of control risk), and rumble strip (road departure risk). Other operating models, with or without conjunction of other vehicle systems, may identify rain or hail on a vehicle roof or windows, worn tire treads, flat tires, and strong wind conditions impacting the vehicle.

In step 350, once the type of impacts on the vehicle have been determined, the controller of the sensor system may identify one or more vehicle control actions to be performed. The vehicle control actions may be signaled by the controller of the sensor system to one or more vehicle control systems of the vehicle, such as braking, acceleration, suspension, steering, seat belt tension, door locks, windows, and the like.

For example, in the presence of strong winds detected as substantially uniform vibration across a portion of the vehicle body directly exposed to a direction of the winds, the controller of the sensor system may signal that velocity of the vehicle is to be lowered, the suspension of the vehicle is to be lowered, and the steering of the vehicle is adjusted to account for impact on a desired direction of travel on a road of the vehicle. Alternatively, in the presence of wet or flooded road conditions detected as impacts of water on a vehicle underbody, the controller of the sensor system may signal that velocity of the vehicle is to be lowered, the suspension of the vehicle is to be raised, and a seatbelt tension is increased to account for a likelihood of aquaplaning of the vehicle.

As a result, appropriate vehicle control actions may be performed to more safely control the vehicle when impacts to the vehicle are detected.

Figure 4:
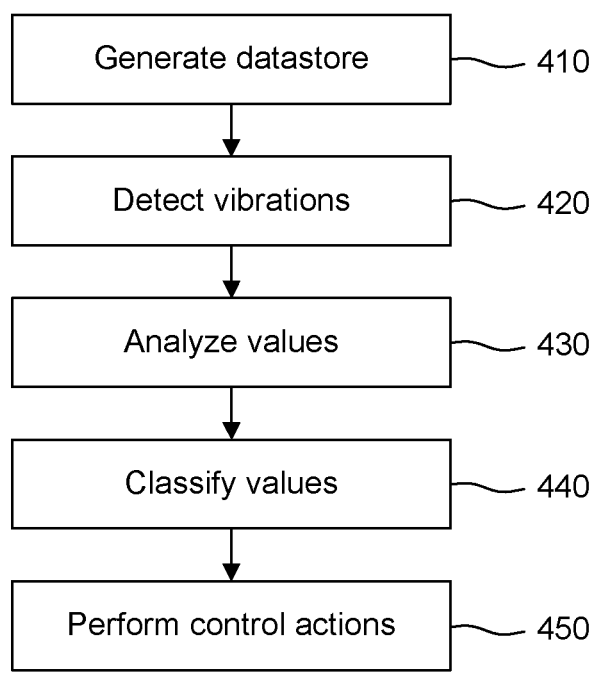
FIG. 4 is a flowchart illustrating a method of a sensor detecting sounds airborne in an environment in which a vehicle operates, according to an embodiment.

FIG. 4 is a flowchart illustrating a method of a sensor system detecting sounds airborne in an environment in which a vehicle operates, according to an embodiment. The method 400 of a sensor system detecting sounds airborne in an environment in which a vehicle operates may be performed under control of the controller 210 in communication with the plurality of sensors 220 of the sensor system 200 illustrated in FIG. 2.

In step 410, a datastore of sensor information of a plurality of sensors mounted to a vehicle is established.

The plurality of sensors may be the plurality of sensors 220 of the sensor system 200 illustrated in FIG. 2, such as the acoustic sensor for sensing sounds generated by external sources in the surrounding environment of the vehicle and the impact sensor for sensing vibrations of the vehicle from impacts generated by external sources in the surrounding environment of the vehicle.

The datastore may be stored as a database, lookup table, or other data structure accessible to the controller 210. For example, the datastore may be stored in memory of the controller 210, stored in a separate memory of the sensor system, stored in a memory of another vehicle control system, or stored in a datastore external to the vehicle but accessible to the controller 210 by the communication interface.

The datastore may store a record associated with each sensor of the plurality of sensors. Each record may include fields of information associated with the sensor.

An identifier field stored in the record associated with the sensor may store an identifier that uniquely identifies the sensor. The identifier may include one or more of a serial number of the sensor, a part number of the sensor, a communication address of the sensor, such as a Medium Access Control (MAC) identifier of a communication interface of the sensor, or other information that uniquely distinguishes the identity of the sensor from other identities of the plurality of sensors.

A location field stored in the record associated with the sensor may store a location on the vehicle that uniquely identifies the location at which the sensor is disposed on the vehicle. The location field may include a component of the vehicle on which the sensor is mounted including such as door, a fender, a hood, a trunk, a windshield, and a window of the vehicle. The location field may further include a local location of the sensor on the component of the vehicle. Thus, the location may relatively refer to a local location on the component of the vehicle. Alternatively, the location may identify a global location on the vehicle, such as a coordinate on a coordinate system mapped to the vehicle.

An expected floor field stored in the record with the sensor may store a value of an expected floor value detected by the sensor. The expected floor value may be a frequency, frequency spectrum, amplitude, or other characteristic of a sound. For example, during operation of the vehicle, an expected value of ambient noise generated by the vehicle or ambient vibrations generated from noise of the vehicle under customary operating conditions, and in the absence of external noise in the surrounding environment or unexpected impacts to the vehicle, may be established and recorded. In the instance of detecting noise in a surrounding environment of the vehicle, the ambient vibrations generated from noise of the vehicle may be expected to be zero. However, during normal operation, every vehicle will experience some level of ambient noise generation owing to power generation, operation of other vehicle systems, such as for example heating and air conditioning, and transverse motion of the vehicle.

The expected floor field may be associated in the datastore with various customary operating conditions of the vehicle, including but not limited to a speed of the vehicle, a direction of travel of the vehicle, such as a forward direction, a reverse direction, a left turning direction, and a right turning direction, a tire pressure of one or more tires of the vehicle, a weight of the vehicle, and any other variable condition of the vehicle that could impact the value of ambient noise generated by the vehicle in the absence of external noise in the surrounding environment or unexpected impacts to the vehicle. As a result, the datastore may store a dataset of fields, tables, and other information that may collectively represent an ambient model of the ambient noise generated by the vehicle under operating conditions in the absence of external noise in the surrounding environment or unexpected impacts to the vehicle.

The datastore of sensor information of the plurality of sensors mounted to the vehicle may be determined experimentally based on a manufacturer and model of the vehicle. Alternatively, the datastore of sensor information may be initialized according to the type of sensor, location of sensor, and quantity of sensors mounted to the vehicle, and the expected ambient noise generated by the vehicle in the absence of external noise in the surrounding environment or unexpected impacts to the vehicle may be trained or learned through operation of the vehicle by an artificial intelligence (AI) model executed by the controller 210 of the sensor system 200 or by a centralized server of a distributed system to which sensor values are provided by the sensor system 200.

In step 420, once the datastore of sensor information is established in step 410, values output by the acoustic sensor representing detected sounds generated by objects in the external environment surrounding the vehicle may be obtained. The values output by the sensors may be provided to the controller of the sensor system for evaluation, for example by the communication interface 230 in FIG. 2.

In step 430, the values output by the plurality of sensors are analyzed. The values output by the plurality of sensors may include values output by the acoustic sensor representing detected sounds generated by objects in the external environment surrounding the vehicle.

The values output by the plurality of sensors may be modeled according to the ambient model from the datastore of sensor information. Accordingly, the controller may determine an operating model of the vehicle based on the values of the sensor information in the datastore and the values output by the plurality of sensors.

In step 440, the operating model of the vehicle may be classified. The operating model may be classified according to type of sounds generated by objects in the external environment surrounding the vehicle. For example, the controller may classify the operating model of the vehicle through an artificial intelligence (AI) model executed by the controller 210 of the sensor system 200 or by a centralized server of a distributed system to which sensor values are provided by the sensor system 200. The operating model may be classified based on comparison with the ambient model and one or more operating models representative of a type of the sounds generated by objects in the external environment surrounding the vehicle.

In step 450, once the type of sounds generated by objects in the external environment surrounding the vehicle have been determined, the controller of the sensor system may identify one or more vehicle control actions to be performed. The vehicle control actions may be signaled by the controller of the sensor system to one or more vehicle control systems of the vehicle, such as braking, acceleration, suspension, steering, seat belt tension, door locks, windows, and the like.

For example, in the presence of strong winds detected as substantially uniform sounds across a portion of the vehicle body directly exposed to a direction of the winds, the controller of the sensor system may signal that velocity of the vehicle is to be lowered, the suspension of the vehicle is to be lowered, and the steering of the vehicle is adjusted to account for impact on a desired direction of travel on a road of the vehicle. Alternatively, in the presence of wet or flooded road conditions detected as sounds of splashing water generated by tires of the vehicle, the controller of the sensor system may signal that velocity of the vehicle is to be lowered, the suspension of the vehicle is to be raised, and a seatbelt tension is increased to account for a likelihood of aquaplaning of the vehicle.

Thus, this contact sensing may be utilized to detect heavy rain and wind conditions applied to the vehicle and warn the user to drive with care, thereby improving existing temperature/ice warning systems.

As a result, appropriate vehicle control actions may be performed to more safely control the vehicle when impacts to the vehicle are detected.

Figure 5:
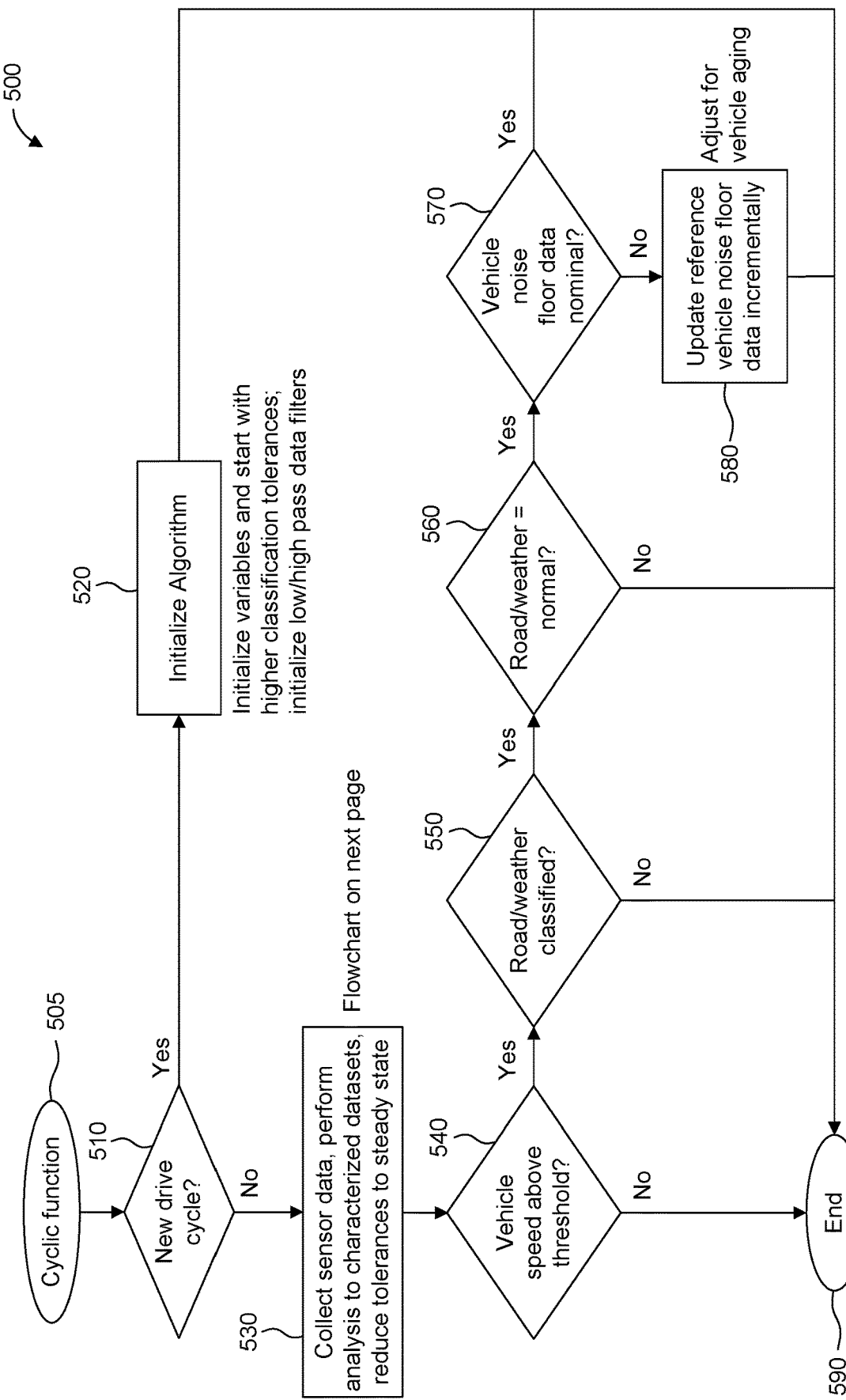
FIG. 5 is a flowchart illustrating a method of a sensor detecting sounds airborne in an environment in which a vehicle operates, according to an embodiment.

FIG. 5 is a flowchart illustrating a method of a sensor detecting sounds airborne in an environment in which a vehicle operates and/or physical impacts on a vehicle, according to an embodiment. The method 500 may be performed under control of the controller 210 in communication with the plurality of sensors 220 of the sensor system 200 illustrated in FIG. 2.

In step 505, the sensor system executes a cyclic function.

In step 510, the sensor system determines whether a new drive cycle is detected.

If a new drive cycle is detected in step 510, then the sensor system initializes an algorithm for detecting sounds airborne in an environment in which a vehicle operates or physical impacts on a vehicle in step 520.

If a new drive cycle is not detected in step 510, then the sensor system may collect sensor data, perform analysis of sounds airborne in an environment in which a vehicle operates or physical impacts on a vehicle, and reduce tolerances of the system to a steady state in step 530.

In step 540, the sensor system may determine whether a vehicle speed of the vehicle is greater than a threshold speed value.

If the vehicle speed is greater than a threshold speed value in step 540, then the sensor system may determine whether a road condition or a weather condition is classified in step 550.

If the road condition or the weather condition is classified in step 550, then the sensor system may determine whether the road condition or the weather condition is a normal condition in step 560.

If the road condition or the weather condition is classified as a normal condition in step 560, then the sensor system may determine whether vehicle noise floor data of the vehicle is nominal in step 570.

If the vehicle noise floor data of the vehicle is not nominal in step 570, then the sensor system may incrementally update reference vehicle noise data, for example to adjust for vehicle aging, in step 580.

If the vehicle speed is not greater than a threshold speed value in step 540, if the road condition or the weather condition is not classified in step 550, if the road condition or the weather condition is not classified as a normal condition in step 560, if the vehicle noise floor data of the vehicle is nominal in step 570, and after initialization of the algorithm in step 520, then the method concludes in step 590.

Figure 6:
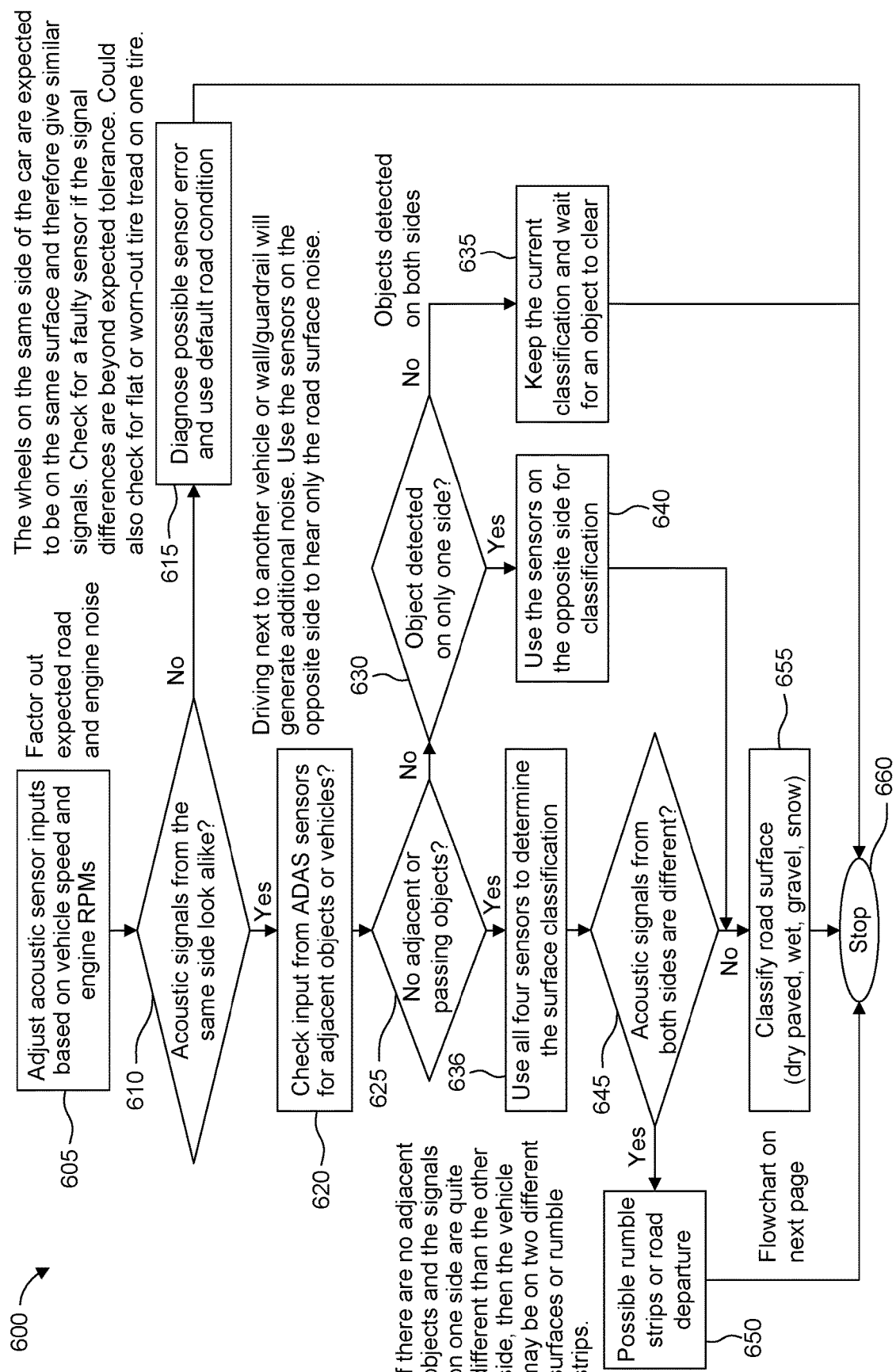
FIG. 6 is a flowchart illustrating a method of a sensor detecting sounds airborne in an environment in which a vehicle operates, according to an embodiment.

FIG. 6 is a flowchart illustrating a method of a sensor detecting sounds airborne in an environment in which a vehicle operates, according to an embodiment. The method 600 may be performed under control of the controller 210 in communication with the plurality of sensors 220 of the sensor system 200 illustrated in FIG. 2.

The method 600 illustrated in FIG. 6 is a detailed description of step 530 in FIG. 5.

In step 605, the sensor system adjusts acoustic sensor inputs, for example based on vehicle speed and engine speed or revolutions to factor out expected road and engine noise.

In step 610, the sensor system determines whether acoustic signals of corresponding origins, which may be detected from a common direction or by a common sensor, are similar.

If the acoustic signals are dissimilar in step 610, then the sensor system diagnoses a possible sensor error and configures to utilize a default road condition in step 615. For example, two wheels on a same side of the car are expected to be on the same surface and therefore similar acoustic signals should be detected from the wheels. A faulty sensor may be determined if the signal differences are beyond an expected tolerance between the signals. Similarly, signal differences could indicate a flat or worn-out tire tread on one tire of the two tires.

If the acoustic signals are similar in step 610, then the sensory system checks an input from an advanced driver assisted system (ADAS) sensors for adjacent objects or vehicles in step 620. For example, driving next to another vehicle, wall, guardrail, or other object will generate additional noise reflected to the sensors. Accordingly, the sensor system may utilize data output by sensors on an opposite side of the vehicle to isolate only the road surface noise.

In step 625, the sensor system determines whether adjacent objects to the vehicle or passing objects that are passing the vehicle are present.

If adjacent objects to the vehicle or passing objects that are passing the vehicle are not present in step 625, then the sensor system determines whether the object is detected on only one side of the vehicle in step 630.

If the object is not detected on only one side of the vehicle in step 630, then the sensor system determines that objects are detected on both sides of the vehicle. Thus, the sensor system maintains a current classification and waits for the object to clear from the vehicle in step 635.

If the object is detected on only one side of the vehicle in step 630, then the sensor system utilizes sensors on an opposite side of the vehicle for classification of the detected signals in step 640.

Accordingly, the sensor system may classify the road surface in step 655. For example, the sensor system may classify a road surface as dry, paved, wet, gravel, snow, etc.

If no adjacent or passing objects are detected in step 625, then the sensor system utilizes sensors from different sides of the vehicle to determine a surface classification in step 636. For example, the sensor system may utilize sensors from four sides of the vehicle.

The sensor system determines whether acoustic signals detected from different sides of the vehicle are different in step 645.

If the acoustic signals detected from different sides of the vehicle are different in step 645, then the sensor system determines the presence of rumble strips or a road departure or deviation, for example towards a shoulder of a road on which the vehicle travels, in step 650. For example, if there are no adjacent objects and the acoustic signals on one side of the vehicle are different than the acoustic signals detected from another side of the vehicle, then the vehicle may be on two different road surfaces or rumble strips may be present on only one side of the vehicle.

If the acoustic signals detected from different sides of the vehicle are not different in step 645, the sensor system may classify the road surface in step 655. For example, the sensor system may classify a road surface as dry, paved, wet, gravel, snow, etc.

The method concludes in step 660 if the sensor system determines the presence of rumble strips or a road departure or deviation in step 650, the sensor system may classifies the road surface in step 655, or the sensor system diagnoses a possible sensor error and configures to utilize a default road condition in step 615.

Figure 7:
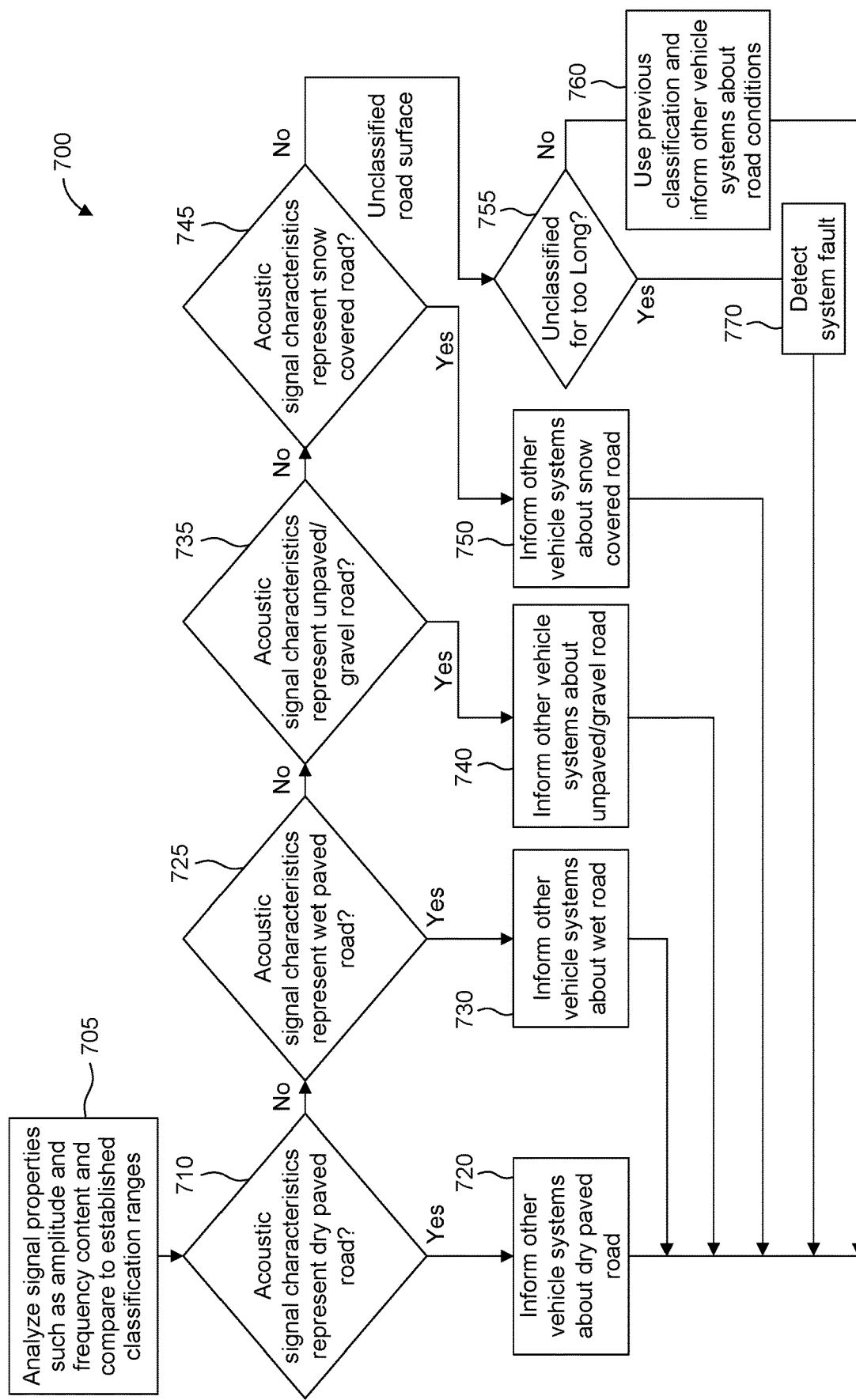
FIG. 7 is a flowchart illustrating a method of a sensor detecting sounds airborne in an environment in which a vehicle operates, according to an embodiment.

FIG. 7 is a flowchart illustrating a method of a sensor detecting sounds airborne in an environment in which a vehicle operates, according to an embodiment. The method 700 may be performed under control of the controller 210 in communication with the plurality of sensors 220 of the sensor system 200 illustrated in FIG. 2.

The method 700 illustrated in FIG. 7 is a detailed description of step 655 in FIG. 6.

In step 705, the sensor system analyzes signal properties, such as amplitude and frequency content. The sensor system compares the amplitude and frequency of the detected signals to established classification ranges.

In step 710, the sensor system determines whether the acoustic signals characteristics represent a dry paved road.

If the sensor system determines the acoustic signals characteristics represent a dry paved road in step 710, then the sensor system informs vehicle systems that the current condition of the vehicle is driving on a dry paved road in step 720.

If the sensor system determines the acoustic signals characteristics do not represent a dry paved road in step 710, then the sensor system determines whether the acoustic signals represent a wet paved road in step 725.

If the sensor system determines the acoustic signals represent a wet paved road in step 725, then the sensor system informs vehicle systems that the current condition of the vehicle is driving on a wet paved road in step 730.

If the sensor system determines the acoustic signals do not represent a wet paved road in step 725, then the sensor system determines whether the acoustic signals represent an unpaved or gravel road in step 735.

If the sensor system determines the acoustic signals represent an unpaved or gravel road in step 735, then the sensor system informs vehicle systems that the current condition of the vehicle is driving on an unpaved or gravel road in step 740.

If the sensor system determines the acoustic signals do not represent an unpaved or gravel road in step 735, then the sensor system determines whether the acoustic signals represent the presence of snow on a road on which the vehicle travels in step 745.

If the sensor system determines the acoustic signals represent the presence of snow on a road on which the vehicle travels in step 745, then the sensor system informs vehicle systems that the current condition of the vehicle is driving on snow in step 750.

If the sensor system determines the acoustic signals do not represent the presence of snow on a road on which the vehicle travels in step 745, then the sensor system determines the road surface is unclassified. In step 755, the sensor system determines whether the road classification remains unclassified for a predetermined amount of time.

If the road condition classification does not remain unclassified for too long in step 755, then the sensor system utilizes a previous classification of the road and informs vehicle systems of the road condition. If the road condition remains unclassified for too long, then the sensor system may determine a system fault.

Although the embodiments discussed above with respect to FIGS. 3, 4, 5, 6 and 7 are separately presented, it should be understood that the controller of the sensor system may implement a combination of detecting impacts on the vehicle and detecting sounds airborne in an environment in which a vehicle operates, to detect and classify a condition of the environment in which the vehicle operates. For example, in the presence of wet or flooded road conditions detected as both impacts of water on a vehicle underbody and sounds of splashing water generated by tires of the vehicle, the controller of the sensor system may signal that velocity of the vehicle is to be lowered, the suspension of the vehicle is to be raised, and a seatbelt tension is increased to account for a likelihood of aquaplaning of the vehicle.

Similarly, although the embodiments discussed above with respect to FIGS. 3, 4, 5, 6, and 7 describe control of appropriate vehicle systems in response to conditions of the environment of the vehicle, the controller of the sensor system may additionally inform a driver or an occupant of the vehicle of the condition via an instrument cluster, audible alert, or tactile alert. As a result, assisted or autonomous control along with the output of information to the driver or occupant may be performed.

The invention claimed is:

1. A method of controlling a vehicle based on an environmental condition in an environment surrounding the vehicle, the method comprising:
   detecting, by an acoustic sensor mounted to the vehicle, a sound in the environment surrounding the vehicle, wherein the sound comprises a sound generated by the impact of foreign objects on the vehicle;
   detecting, by an impact sensor mounted to the vehicle, a vibration generated by an impact of the foreign objects on the vehicle;
   determining that the sound is generated by the impact on the vehicle based on the sound detected by the acoustic sensor and the vibration detected by the impact sensor;
   determining the vehicle travels on an unpaved surface as the environmental condition corresponding to the sound generated by the impact on the vehicle;
   determining a vehicle control action to be performed based on the environmental determining the vehicle travels on the unpaved surface; and
   controlling a vehicle system of the vehicle to perform the vehicle control action.

2. The method of claim 1, wherein the acoustic sensor comprises at least one of a microphone and a hydrophone, and
   wherein the impact sensor comprises a microelectromechanical systems (MEMS) sensor.

3. The method of claim 2,
   wherein the foreign objects comprise at least one of rocks, stones, dust, sand, and vegetation from the unpaved surface.

4. The method of claim 2, wherein determining the vehicle travels on the unpaved surface as the environmental condition corresponding to the sound generated by the impact on the vehicle comprises determining the vehicle travels on the unpaved surface corresponding to the sound generated by the impact on the vehicle based on a location at which the acoustic sensor is mounted to the vehicle and a location at which the impact sensor is mounted to the vehicle.

5. The method of claim 2, wherein the location at which the acoustic sensor is mounted and the location at which the impact sensor is mounted comprises at least one of a global location on the vehicle and a local location relative to a component of the vehicle.

6. The method of claim 2, wherein determining the vehicle travels on the unpaved surface as the environmental condition corresponding to the sound generated by the impact on the vehicle comprises determining the vehicle travels on the unpaved surface as corresponding to the sound generated by the impact on the vehicle based on at least one of an amplitude and a frequency of a signal corresponding to sound detected by the acoustic sensor and at least one of an amplitude and a frequency of a signal corresponding to the vibration detected by the impact sensor.

7. The method of claim 2, wherein determining the vehicle travels on the unpaved surface as the environmental condition corresponding to the sound generated by the impact on the vehicle comprises determining the vehicle travels on the unpaved surface as corresponding to the sound generated by the impact on the vehicle based on at least one of ambient noise generated during operation of the vehicle and ambient vibration generated during operation of the vehicle.

8. The method of claim 2, wherein the vehicle control action comprises at least one of controlling a velocity of the vehicle, controlling a suspension of the vehicle, controlling an acceleration of the vehicle, controlling a braking of the vehicle, and controlling a steering of the vehicle.

9. A system for controlling a vehicle based on an environmental condition in an environment surrounding the vehicle, the system comprising:
   an acoustic sensor disposed on the vehicle, the acoustic sensor configured to detect a sound in the environment surrounding the vehicle, wherein the sound comprises a sound generated by the impact of foreign objects on the vehicle;
   an impact sensor disposed on the vehicle, the impact sensor configured to detect a vibration generated by an impact of the foreign objects on the vehicle; and
   a controller configured to determine that the sound is generated by the impact on the vehicle based on the sound detected by the acoustic sensor and the vibration detected by the impact sensor, determine the vehicle travels on an unpaved surface as the environmental condition corresponding to the sound generated by the impact on the vehicle, determine a vehicle control action to be performed based on determining the vehicle travels on the unpaved surface, and control a vehicle system of the vehicle to perform the vehicle control action.

10. The system of claim 9, wherein the acoustic sensor comprises at least one of a microphone and a hydrophone, and
    wherein the impact sensor comprises a microelectromechanical systems (MEMS) sensor.

11. The system of claim 10,
    wherein the foreign objects comprise at least one of rocks, stones, dust, sand, and vegetation from the unpaved surface.

12. The system of claim 10, wherein the controller is configured to determine the vehicle travels on the unpaved surface as the environmental condition corresponding to the sound generated by the impact on the vehicle based on a location at which the acoustic sensor is mounted to the vehicle and a location at which the impact sensor is mounted to the vehicle.

13. The system of claim 10, wherein the location at which the acoustic sensor is mounted and the location at which the impact sensor is mounted comprises at least one of a global location on the vehicle and a local location relative to a component of the vehicle.

14. The system of claim 10, wherein the controller is configured to determine the vehicle travels on the unpaved surface as the environmental condition corresponding to the sound generated by the impact on the vehicle based on at least one of an amplitude and a frequency of a signal corresponding to sound detected by the acoustic sensor and at least one of an amplitude and a frequency of a signal corresponding to the vibration detected by the impact sensor.

15. The system of claim 10, wherein the controller is configured to determine the vehicle travels on the unpaved surface as the environmental condition corresponding to the sound generated by the impact on the vehicle based on at least one of ambient noise generated during operation of the vehicle and ambient vibration generated during operation of the vehicle.

16. The system of claim 10, wherein the vehicle control action comprises at least one of controlling a velocity of the vehicle, controlling a suspension of the vehicle, controlling an acceleration of the vehicle, controlling a braking of the vehicle, and controlling a steering of the vehicle.

\* \* \* \* \*